United States Patent
Weatherall et al.

(10) Patent No.: US 10,451,488 B2
(45) Date of Patent: Oct. 22, 2019

(54) CONTRAST PHANTOM FOR PASSIVE MILLIMETER WAVE IMAGING SYSTEMS

(71) Applicant: Battelle Memorial Institute, Columbus, OH (US)

(72) Inventors: James C. Weatherall, Linwood, NJ (US); Jeffrey B. Barber, Vineland, NJ (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 16/018,223

(22) Filed: Jun. 26, 2018

(65) Prior Publication Data
US 2018/0299331 A1 Oct. 18, 2018

Related U.S. Application Data

(62) Division of application No. 15/026,315, filed as application No. PCT/US2014/058550 on Oct. 1, 2014, now Pat. No. 10,197,451.
(Continued)

(51) Int. Cl.
*G01K 7/00* (2006.01)
*G01J 5/52* (2006.01)
*G01J 5/00* (2006.01)

(52) U.S. Cl.
CPC ............... *G01K 7/00* (2013.01); *G01J 5/522* (2013.01); *G01J 2005/0077* (2013.01)

(58) Field of Classification Search
CPC .... G01J 1/0429; G01J 1/22; G01J 4/00; G01J 2004/002; G01J 2004/008; G01J 5/0825;
(Continued)

(56) References Cited

U.S. PATENT DOCUMENTS 4,387,301 A 6/1983 Wirick et al.
5,265,958 A 11/1993 Ludlow
(Continued)

FOREIGN PATENT DOCUMENTS

WO 2012135477 A1 10/2012
WO 2015050941 A1 4/2015

OTHER PUBLICATIONS

Rödig, Christoph; International Search Report and Written Opinion of the International Searching Authority; International Application No. PCT/US2014/058550; dated Feb. 6, 2015; European Patent Office; Rijswijk, Netherlands.
(Continued)

*Primary Examiner* — Lisa M Caputo
*Assistant Examiner* — Philip L Cotey
(74) *Attorney, Agent, or Firm* — Stevens & Showalter LLP (57) ABSTRACT

In a system that includes a wire grid polarizer, the polarizer is positioned between a thermal illuminator and a thermal emitter such that energy from the thermal illuminator traveling towards the thermal emitter is transformed into linearly polarized energy. In the system, the thermal emitter is configured to reflect at least a portion of the linearly polarized energy towards a millimeter-wave camera and there is a motor coupled with the wire grid polarizer and configured to rotate the polarizer in a manner that varies an apparent temperature of the thermal emitter based on the reflected portion of the linearly polarized energy.

9 Claims, 9 Drawing Sheets

Related U.S. Application Data (60) Provisional application No. 61/886,953, filed on Oct. 4, 2013.

(58) Field of Classification Search
CPC .................. G01J 5/58; G01J 2005/586; G01J 2009/0261; G01J 5/522; G01J 2005/0077; G01K 7/00
See application file for complete search history.

(56) References Cited

U.S. PATENT DOCUMENTS

| | | | |
|---|---|---|---|
| 5,335,260 A | 8/1994 | Arnold | |
| 5,534,694 A * | 7/1996 | Ball | G01J 1/26 250/330 |
| 5,565,678 A | 10/1996 | Manian | |
| 6,310,345 B1 * | 10/2001 | Pittman | G01J 4/00 250/330 |
| 6,777,684 B1 * | 8/2004 | Volkov | G01N 21/3581 250/341.1 |
| 7,609,978 B2 * | 10/2009 | Wollack | G01J 4/00 398/204 |
| 7,616,903 B2 * | 11/2009 | Wollack | G01J 4/00 398/204 |
| 7,767,927 B2 * | 8/2010 | Markle | G01J 5/0003 219/121.62 |
| 8,000,441 B2 | 8/2011 | Lang et al. | |
| 9,330,330 B2 * | 5/2016 | Karam | G06K 9/4604 |
| 2004/0066327 A1 * | 4/2004 | Salmon | G01K 11/006 342/351 |
| 2004/0130311 A1 * | 7/2004 | Humphreys | G01J 5/06 324/76.11 |
| 2004/0262499 A1 * | 12/2004 | Martinelli | G02F 1/0136 250/225 |
| 2007/0146723 A1 * | 6/2007 | Chuss | G01J 4/00 356/491 |
| 2008/0290265 A1 * | 11/2008 | Daly | G01J 5/02 250/252.1 |
| 2010/0006761 A1 * | 1/2010 | Johnson | G01J 3/02 250/343 |
| 2011/0266443 A1 * | 11/2011 | Schimert | G01J 1/02 250/338.4 |
| 2011/0266445 A1 * | 11/2011 | Beratan | G01J 1/02 250/338.4 |
| 2011/0278459 A1 * | 11/2011 | Hohl | G08B 3/10 250/340 |
| 2015/0198703 A1 * | 7/2015 | Karam | G06K 9/4604 342/27 |

OTHER PUBLICATIONS

Weatherall, James C.; "Emission From Dielectric Materials at Millimeter Wavelengths in Passive Thermal Environments"; Proceedings of SPIE, vol. 7670; Apr. 23, 2010; pp. 76700F-1-76700F-8; Bellingham, Washington.

Yukari Nakamura; International Preliminary Report on Patentability; International Patent Application No. PCT/US2014/058550; dated Apr. 5, 2016; International Bureau of WIPO; Geneva, Switzerland.

R. Krupa et al.; "Balanced Calibration Technique with an Internal Reference Load for Ground Based Millimeter Wave Radiometry"; published in IGARSS '98, Sensing and Managing the Environment,1998 IEEE International Geoscience and Remote Sensing, Symposium Proceedings; p. 387-389, vol. 1 (1998); doi: 10.1109/IGARSS.1998.702914; retrieved from http://ieeexplore.ieee.org/stamp/stamp.jsp?tp=&arnumber=702914&isnumber=15194.

* cited by examiner

CONTRAST PHANTOM FOR PASSIVE MILLIMETER WAVE IMAGING SYSTEMS

RELATED APPLICATIONS

The present application is a divisional of, and claims priority from and benefit of, U.S. patent application Ser. No. 15/026,315 filed Mar. 31, 2016, which is the National Stage Entry of Application No. PCT/US2014/058550 filed Oct. 1, 2014, which claims priority from and benefit of U.S. Provisional Patent Application Ser. No. 61/886,953 filed Oct. 4, 2013, the disclosures of which are incorporated herein in their entirety.

BACKGROUND ART

The present disclosure relates to passive millimeter wave imaging systems, and more specifically, to contrast phantoms for such systems.

Unlike X-ray systems with their ionizing radiation, and active Microwave systems which bathe an object in RF energy, passive millimeter-wave (PMMW) imaging systems read the natural thermal energy in an environment much like an infrared camera. However, infrared wavelengths are too short to pass through clothing so longer wavelengths are chosen such as 3 mm (or from about 80 to 100 GHz).

Heat coming off a human body is interrupted by occluding objects which have a temperature of their own, or reflect other temperatures in the environment, giving rise to contrast that can imaged by a millimeter wave camera or radiometer.

DISCLOSURE OF INVENTION

One aspect of the present disclosure relates to a system that includes a wire grid polarizer, wherein the polarizer is positioned between a thermal illuminator and a thermal emitter such that energy from the thermal illuminator traveling towards the thermal emitter is transformed into linearly polarized energy. In the system the thermal emitter is configured to reflect at least a portion of the linearly polarized energy towards a millimeter-wave camera and there is a motor coupled with the wire grid polarizer and configured to rotate the polarizer in a manner that varies an apparent temperature of the thermal emitter based on the reflected portion of the linearly polarized energy.

Another aspect of the present disclosure relates to a method that includes locating a wire grid polarizer between a thermal illuminator and a thermal emitter such that energy radiated from the thermal illuminator traveling towards the thermal emitter is transformed into linearly polarized energy; reflecting, by the thermal emitter, at least a portion of the linearly polarized energy towards a millimeter-wave camera; and rotating the wire grid polarizer in a manner that varies an apparent temperature of the thermal emitter based on the reflected portion of the linearly polarized energy.

BRIEF DESCRIPTION OF DRAWINGS

Aspects of the present disclosure are illustrated by way of example and are not limited by the accompanying figures with like references indicating like elements.

BEST MODE FOR CARRYING OUT THE INVENTION

As will be appreciated by one skilled in the art, aspects of the present disclosure may be illustrated and described herein in any of a number of patentable classes or context including any new and useful process, machine, manufacture, or composition of matter, or any new and useful improvement thereof.

"Contrast phantoms", "imaging phantoms", or "phantoms" are used interchangeably herein to refer to specially designed objects that are scanned or imaged to evaluate, analyze, and tune the performance of an imaging device or system. As mentioned briefly above, millimeter waves may be used in personnel imaging systems because of their ability to penetrate clothing and reveal concealed explosives, weapons, and contraband. Some systems are "passive" in the sense that they use environmental (i.e., thermal) millimeter-waves for illumination. Image contrast in passive systems occurs because the effective surface temperature in the image varies due to differences in surface reflections, transmissions through layers of materials, and intrinsic emissivity of bulk items. In accordance with the principles of the present disclosure, it is beneficial to have a device which presents an imaging phantom that emits millimeter-wave intensities in discrete, calibrated temperature steps for the purpose of verifying the performance of passive millimeter-wave systems. For example, wavelengths from about 1 to 1000 GHz may be utilized.

Contrast objects for thermal IR imaging, for example as described in U.S. Pat. No. 5,265,958, utilize differences in temperature/emissivity to generate contrast. Materials used for IR test objects are blackbodies and thus are optically thick; the back surface of the blackbody cannot be observed. At millimeter wave frequencies, as absorption decreases with decreasing frequency, many more materials become semi-transparent. In order to generate contrast, it is possible to utilize reflectivity, transmission, and absorption in dielectric slabs.

Aspects of the present disclosure relate to a substantially transparent slab that is placed on a thermal backdrop surface such that the slab is in the path of radiation emitted from a thermal illuminator. A backing surface of the transparent slab is highly reflective and the transparent slab has multiple portions with each portion having a different thickness. A small amount of the radiation from the thermal illuminator will be reflected from the front surface of the slab, some of the radiation will be absorbed by the transparent slab, and the remaining radiation will be reflected by the highly reflective backing surface. The thermal illuminator, the backing surface, and the transparent slab are arranged so that the reflected radiation is directed to a millimeter-wave camera.

The thermal backdrop comprises a relatively large thermal mass compared to the transparent slab and the temperature of the thermal backdrop is controlled so as to maintain the transparent slab at a predetermined temperature. The thermal illuminator is operated at its own predetermined temperature, which, for example, may be greater than the temperature of the thermal backdrop. The amount of radiation absorbed by a portion of the transparent slab depends on the thickness of that portion and results in that portion appearing to be at a particular temperature to the millimeter-wave camera.

For example, a thin portion of the transparent slab will allow a substantial amount of the radiation from the thermal illuminator to pass through it, be reflected by the backing surface, and then pass back through the thin portion to the camera. A much thicker portion of the transparent slab will absorb more of the radiation from the thermal illuminator such that only a small portion of the thermal radiation reaches the backing surface for reflection back through the slab to the camera. Hence, the emission temperature from the thinner portion seen by the camera will be greater than that from the thicker portion. The respective thicknesses of the portions of the transparent slab can be chosen so that the transparent slab provides millimeter-wave intensities in discrete, calibrated temperature steps for the purpose of verifying performance of a passive millimeter-wave system.

Figure 1:
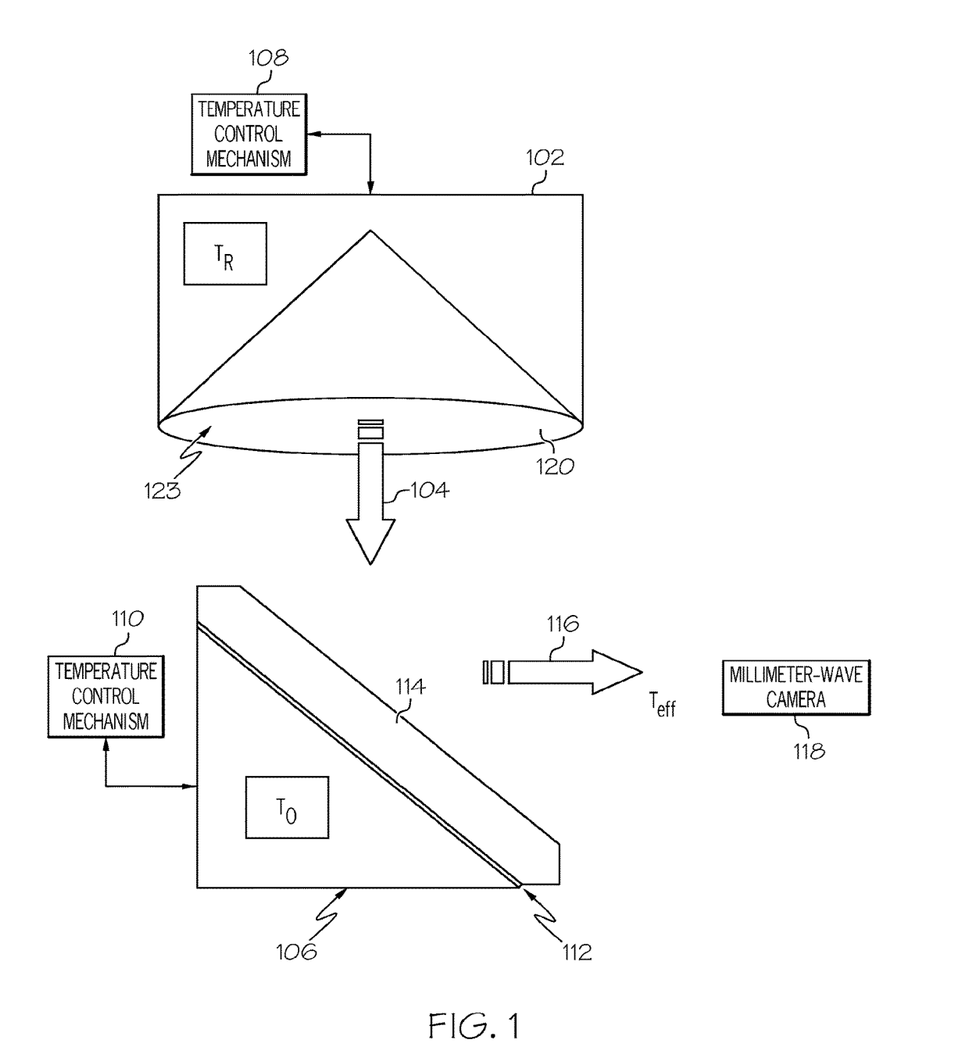
FIG. 1 illustrates a side view of a contrast phantom in accordance with the principles of the present disclosure.

FIG. 1 illustrates a side view of a contrast phantom in accordance with the principles of the present disclosure. In FIG. 1 there is a thermal backdrop 106 that is maintained at a temperature, $T_0$, by a temperature control mechanism 110. The thermal backdrop 106 has a larger thermal mass than the partially transparent slab 114 which is described in detail below. The thermal backdrop 106 may, for example, be a triangular pyramid constructed of aluminum or other metal and the temperature control mechanism 110 may, for example, sense a temperature of the backdrop 106 and circulate fluid through tubes or hollow structures within the thermal backdrop 106 to adjust its temperature accordingly. One of ordinary skill will recognize a variety of alternatives could be used to construct a thermal backdrop 106 and maintain it at a predetermined temperature, $T_0$, without departing from the scope of the present disclosure.

Figure 2:
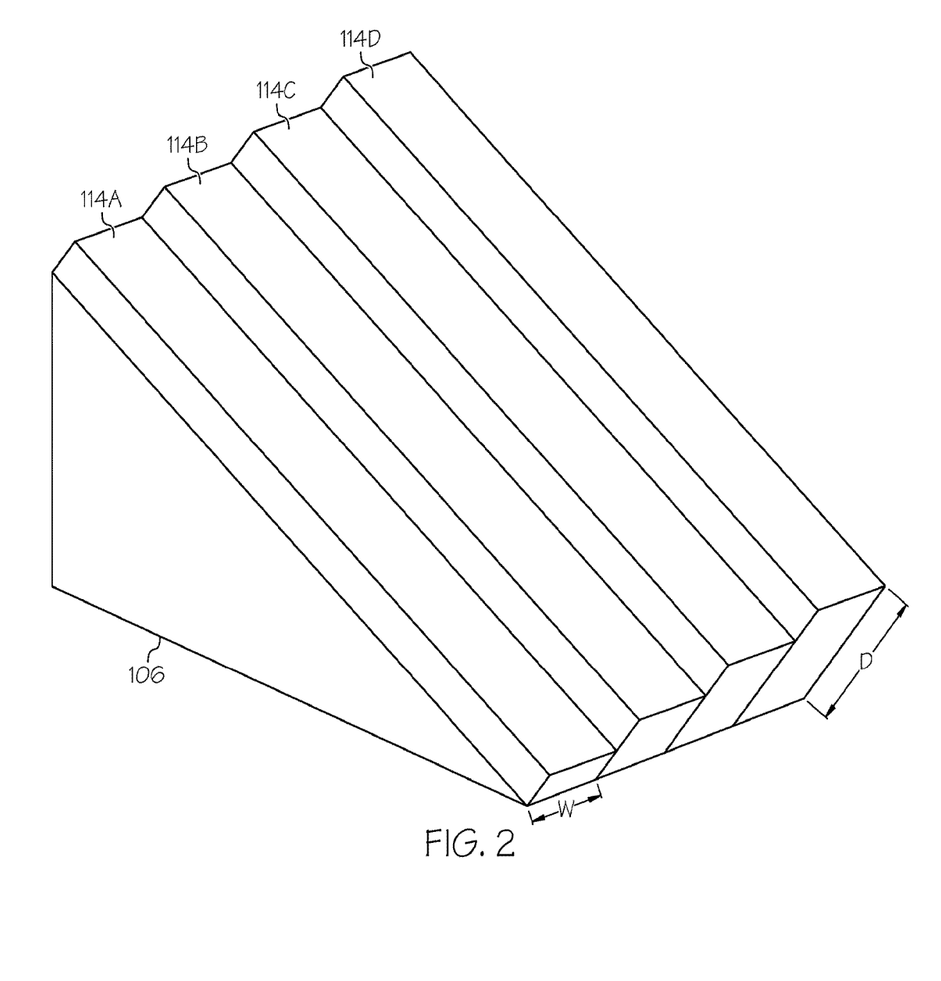
FIG. 2 illustrates a perspective view of portions of a contrast phantom in accordance with the principles of the present disclosure.

An emitting surface of the thermal backdrop may be constructed from a partially or mainly transparent slab having multiple portions, each with their own thickness or from a plurality of partially or mainly transparent slabs of material. In FIG. 1, only 1 portion of the slab 114 is visible. However, the perspective view of FIG. 2 depicts a thermal backdrop 106 having an emitting surface that includes four different portions 114A-114D of varying thickness. As an example, the thickness of slab 114D is depicted in FIG. 2 as "D".

Polycarbonate plastic is one example of a material that has optical and thermal properties that are beneficial in a contrast phantom in accordance with the principles of the present disclosure. As for size, the width, "W", of each slab portion 114A-114D can be about 10 cm ("about" can be e.g., ±1 cm). The length of each slab portion 114A-114D can be between about 10 to 100 cm ("about" can be e.g., ±5 cm). While one of ordinary skill will recognize that the specific size of each slab portion 114A-114D can vary without departing from the intended scope of the present disclosure, the above example sizes can be distinctly resolved in typical millimeter-wave imaging systems. The vertical alignment of the slab portions 114A-114D is beneficial in that no slab portion obscures or shadows another slab portion with respect to the thermal energy 104 provided by the thermal illuminator 102. The slab 114 may be made of other material than polycarbonate plastic. Almost any dielectric material having known reflective and refractive characteristics at millimeter-wave wavelengths can be used.

Each of the slab portions 114A-114D has a backing surface 112 that may be highly reflective and can be presented to the camera 118 at an angle of about 45° (e.g., ±5°). Because of the temperature control of the thermal backdrop 106, the temperature of the reflective backing surface 112 is also maintained at substantially $T_0$. The slab portions 114A-114D, having a thermal mass less than the temperature controlled body of the thermal backdrop 106, are also maintained at a temperature of about $T_0$ because of thermal conduction through the reflective surface 112. The reflective backing surface 112 may be part of the construction of the slab 114 or may alternatively be a top surface of the thermal backdrop 106 on which the slab 114 sits.

Returning to FIG. 1, the thermal illuminator 102 is provided that illuminates, or radiates, the slab portions 114A-114D with thermal energy 104 at a temperature $T_R$. The thermal illuminator 102 may be designed to act as a block body emitter at a predetermined temperature, $T_R$, and therefore the illuminator 102 can include a surface 120 that is maintained at that temperature and is beneficially covered with a material that absorbs millimeter-wave wavelengths (to reduce any ambient reflection). For example, similar to the thermal backdrop 106, a temperature control mechanism 108 can be included that maintains the temperature of a large thermal mass illuminator 102 at the appropriate temperature $T_R$. As shown in FIG. 1, the thermal illuminator 102 can include a conical cavity 123 whose surface 120 is of an appropriate material. One of ordinary skill will readily recognize that other types of thermal illuminators may be used without departing from the scope of the present disclosure.

As a result of the configuration of the illuminator 102, backdrop 106, and the camera 118, thermal energy 104 is radiated onto the transparent slab 114 such that a portion of that thermal energy 104 is reflected towards the camera 118. The transparent slab 114 also radiates its own thermal energy based on its own temperature. The combination of the reflected energy and the thermal energy of the slab 114 results in a particular amount of thermal energy, $T_{eff}$ 116, being received by the camera 118 to be imaged.

Thus, FIG. 1 depicts a system that includes a thermal backdrop 106 that has a body having a top face, a contrast phantom 114 positioned above the top face and aligned substantially parallel with the top face, and a reflective layer 112 located between the body and the contrast phantom 114 and aligned substantially parallel with the top face. There is also a thermal illuminator 102 configured to radiate thermal energy 104 in a first direction towards the contrast phantom 114; wherein the first direction is aligned with the top face such that when the thermal energy 104 is radiated in the first direction a first portion of the thermal energy is absorbed by the contrast phantom 114 and a second portion of the thermal energy is reflected by the reflective layer 112 towards a millimeter-wave camera in a second direction. Of particular benefit, the contrast phantom 114 comprises a plurality of different portions 114A-114D (shown in FIG. 2), with each portion having a different respective thickness along the first direction.

Figure 3:
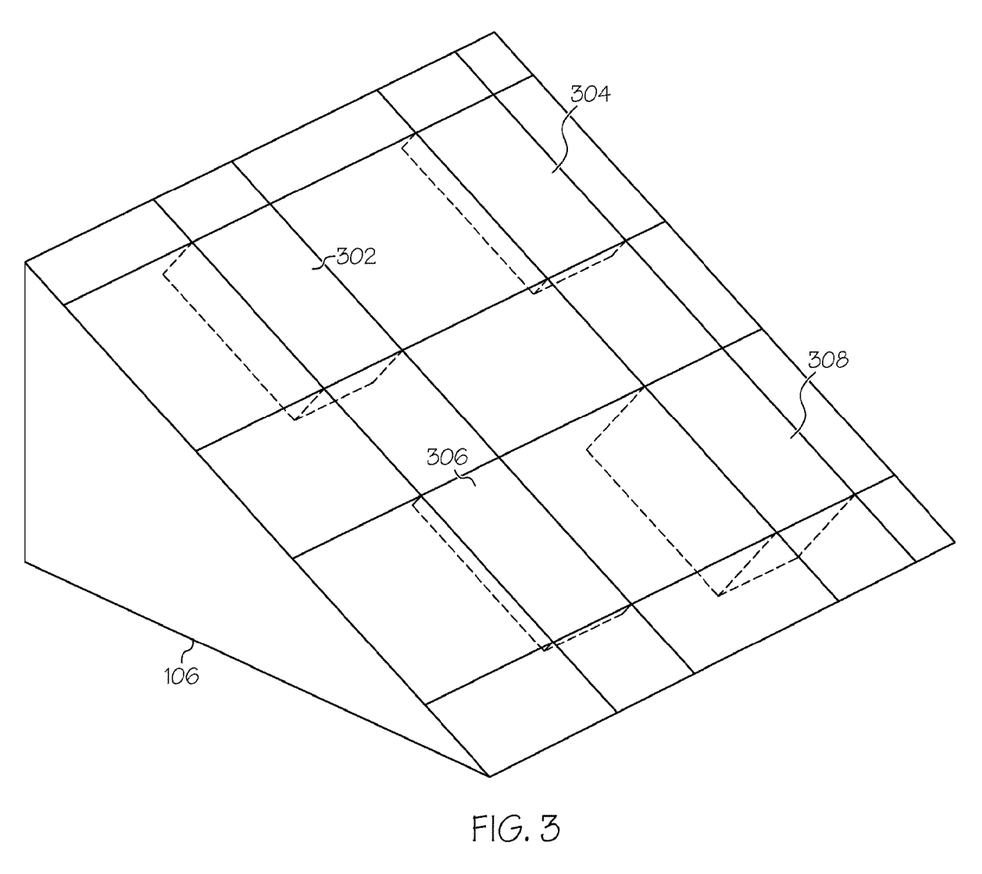
FIG. 3 illustrates a perspective view of portions of an alternative contrast phantom in accordance with the principles of the present disclosure.

FIG. 3 illustrates a perspective view of portions of an alternative contrast phantom in accordance with the principles of the present disclosure. In FIG. 3, there are four (simply by way of example) different slabs 302, 304, 306, 308. As shown, the slabs 302, 304, 306, 308 could be embedded into the metal surface of the block of the thermal backdrop 106. This configuration may improve the thermal "soaking" of the slabs to temperature $T_0$, the temperature of the block, and illustrates an example of how additional temperature steps could be incorporated by having both columns and rows of slabs 302, 304, 306, 308 with different thicknesses.

In accordance with the principles of the present disclosure, a slab portion 114A-114D, for example, is maintained at a known temperature (i.e., $T_0$) and also illuminated with thermal energy at a known temperature (i.e., $T_R$). Some of that illuminating thermal energy is absorbed by the slab portion 114A-114D but some passes through each slab portion, strikes the reflective backing surface 112 and is emitted towards the camera 118. The camera 118 determines an apparent, or effective, temperature of each slab portion 114A-114D based on the amount of the illuminating thermal energy 104 that is reflected towards the camera 118. If, for a particular slab portion, almost all of the illuminating energy is reflected towards the camera 118, then that slab portion will appear to be close in temperature to the thermal illuminator 102. If, however, little of the illuminating energy is reflected towards the camera 118, then the temperature of that slab portion will appear to be close to that of the thermal backdrop 106. By varying the respective thickness of each portion of the slab 114, the camera 118 can image phantoms that appear to be at different temperatures even though the slab 114 is being maintained substantially at a temperature $T_0$.

The theory for the brightness of radiation in millimeter waves in passive thermal environments reveals that with illumination at temperature $T_R$ reflecting on a phantom (i.e., one of the slab portions 114 A-114D) at temperature $T_0$ and thickness, "D", backed by a metallic reflector, the effective, or apparent, temperature to the camera 118 is given by:

$$T_{eff} = rT_R + eT_0 \quad \text{EQUATION 1:}$$

Where the intensity reflectivity of a slab portion, r, and emissivity of the slab portion, e, are given by EQUATION 2:

$$r = R_1 + \frac{(1-R_1)^2}{1 - R_1 R_2 \exp(-2\kappa L)} R_2 \exp(-2\kappa L)$$

$$e = \frac{(1-R_1)(1 + R_2\exp(-\kappa L))}{1 - R_1 R_2 \exp(-2\kappa L)}(1 - \exp(-\kappa L))$$

In the above equations $R_1$, and $R_2$, are the reflection coefficients at the air/slab interface and slab/backing surface interface, respectively. Because the backing surface 112 can be considered almost a perfect reflector, $R_2=1$ can be used in the equations. At an angle of incidence, i (where, for example, i=45°) the air/slab portion intensity reflection coefficient $R_1$ is given by EQUATION 3:

$$R_1 = \left| \frac{n^2 \cos(i) - \sqrt{n^2 - \sin^2(i)}}{n^2 \cos(i) + \sqrt{n^2 - \sin^2(i)}} \right|^2$$

This reflection coefficient, $R_1$, assumes wave polarization parallel to the plane of incidence. The emissivity models for parallel and perpendicular polarizations are different, but the differences are relatively small. In practice, the polarization of the millimeter wave camera will be known, so one of ordinary skill will recognize that the polarization appropriate to the camera can be used for calculating the reflection coefficient $R_1$. Assuming that the phantom slabs, or slab portions, are made of polycarbonate plastic with index of refraction n=1.66+0.0045i and an absorption coefficient $\kappa$=0.17/cm, the reflection coefficient is computed to be $R_1$=0.017.

Figure 4:
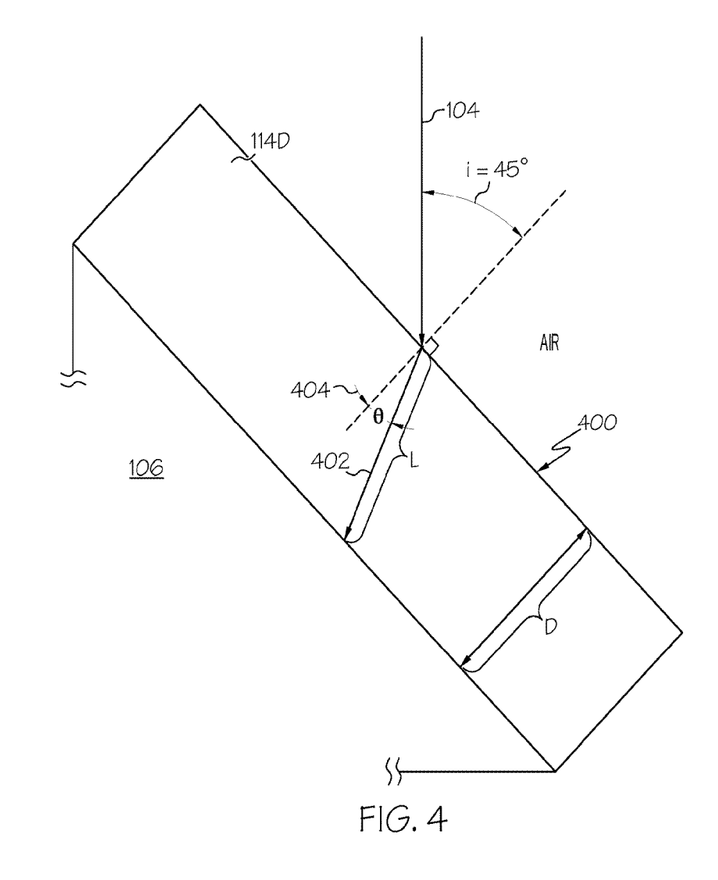
FIG. 4 illustrates details about a path that thermal energy travels in a contrast phantom in accordance with the principles of the present disclosure.

FIG. 4 illustrates details about a path that thermal energy travels in a contrast phantom in accordance with the principles of the present disclosure. Even though the slab portion 114D has a thickness of "D", the length a wave travels in the slab portion 114D is a distance 402 labeled "L" in FIG. 4 and is used in the above equations to calculate the intensity reflectivity of a slab portion, r, and emissivity of the slab portion, e. Incident energy 104 arriving at the air/slab interface 400 at an angle of about 45° will be refracted in such a way that energy traveling in the slab portion 114D will travel at an angle 404 relative to a normal to the interface 400. The distance "402" is given by:

$$L=(D/\cos(\theta))$$

For polycarbonate plastic, for example, $\theta$=24.5° which gives $\cos(\theta)$=0.91.

Figure 5:
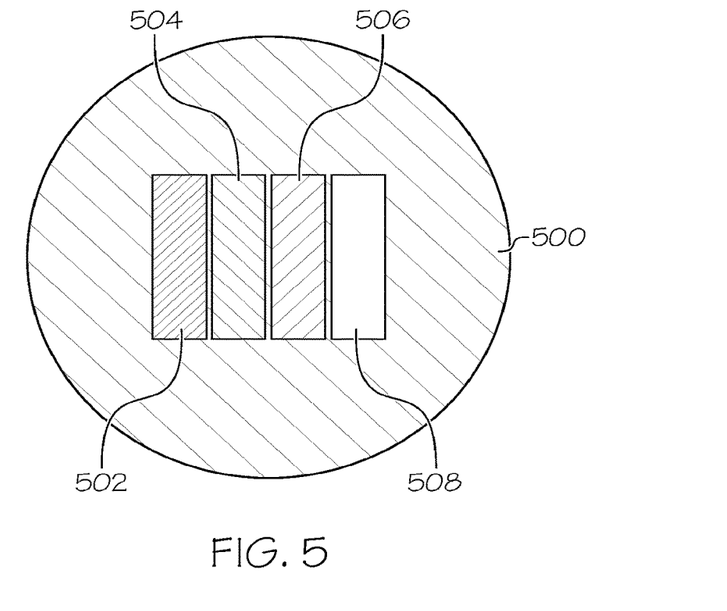
FIG. 5 is a conceptual illustration of what a radiometer may capture when used in conjunction with a contrast phantom in accordance with the principles of the present disclosure.

FIG. 5 is a conceptual illustration of what a radiometer may capture when used in conjunction with a contrast phantom in accordance with the principles of the present disclosure. In FIG. 5, there is an image area 502 that captures an image of the four slab portions 114A-114D of FIG. 2. Because of the differences in thickness of the different slab portions 114A-114D, some will absorb more illuminating thermal energy and some will reflect more illuminating energy to the camera 118. Thus, the four slab portions 114A-114D will appear to be at different effective temperatures for the camera 118. The pixel intensities (or colors) of the four regions 502, 504, 506, 508 are different in the image 502 because of the different effective temperatures of the four slab portions 114A-114D. In particular, if the effective temperatures of each slab portion 114A-114D are known, then the image 502 of FIG. 5 can be useful in determining if the camera 118 is operating properly and can be useful in interpreting the temperature of various objects in operationally-captured images.

Typically, millimeter wave cameras construct an image of a scene based on thermal energy detected by a receiver array. The camera can construct an image over a temperature range bounded by room temperature and body temperature. Thus, a contrast phantom can be constructed such that one slab portion thickness is chosen that corresponds to room temperature (i.e., about 0% reflection) and another slab portion thickness is chosen for body temperature (i.e., about 100% reflection). Between these two thicknesses, slab portions of varying thicknesses can be provided to create a contrast phantom having discrete steps based on how many different slab portions are used.

An example nine-step contrast phantom is provided below in which the illuminator 102 has a temperature, $T_0$, of about 100° F. (e.g., ±5°), and a thermal backdrop 106 has a temperature, $T_R$, of about 55° F. (e.g., ±5°). The table below provides a model of effective temperature, $T_{eff}$, as a function of a thickness "D" of polycarbonate slab portions using EQUATION 1.

Effective temperature as a function of phantom slab thickness

| D (cm) | exp (−kL) | r | e | Teff (F.) |
|---|---|---|---|---|
| 0 | 1 | 1 | 0 | 100 |
| 0.3 | 0.95 | 0.89 | 0.11 | 95.2 |
| 0.7 | 0.88 | 0.77 | 0.23 | 89.7 |
| 1.1 | 0.81 | 0.66 | 0.34 | 84.9 |
| 1.6 | 0.74 | 0.55 | 0.45 | 79.9 |
| 2.2 | 0.66 | 0.44 | 0.56 | 75.0 |
| 3.0 | 0.57 | 0.33 | 0.67 | 70.0 |
| 4.2 | 0.46 | 0.22 | 0.78 | 64.9 |
| 6.0 | 0.33 | 0.12 | 0.88 | 60.4 |

Using the above thicknesses, a contrast phantom could be constructed with nine separate slab portions. When that contrast phantom is imaged, nine discrete steps can be identified in the image which respectively correspond to each of the different slab portions. Each slab portion is a "phantom" emitter producing radiation at a calibrated temperature. As seen from the above table, the nine discrete steps are evenly spaced with about 5° separating each step.

Figure 6:
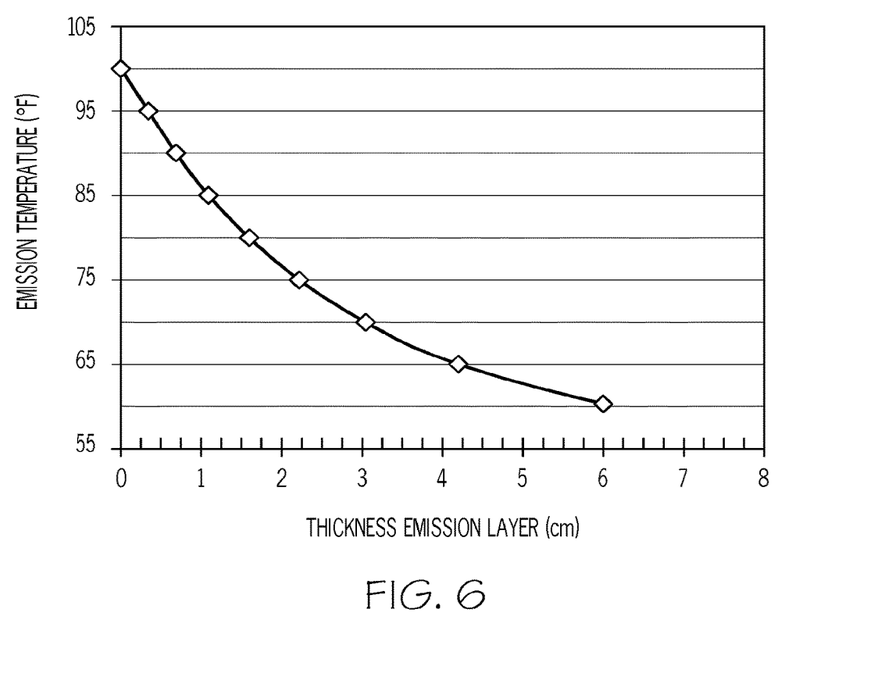
FIG. 6 is a graph of effective temperature versus thickness of an emission layer of a contrast phantom in accordance with the principles of the present disclosure.

FIG. 6 is a graph of the information in the above table relating to an effective temperature versus thickness of an emission layer of a contrast phantom in accordance with the principles of the present disclosure.

Figure 7:
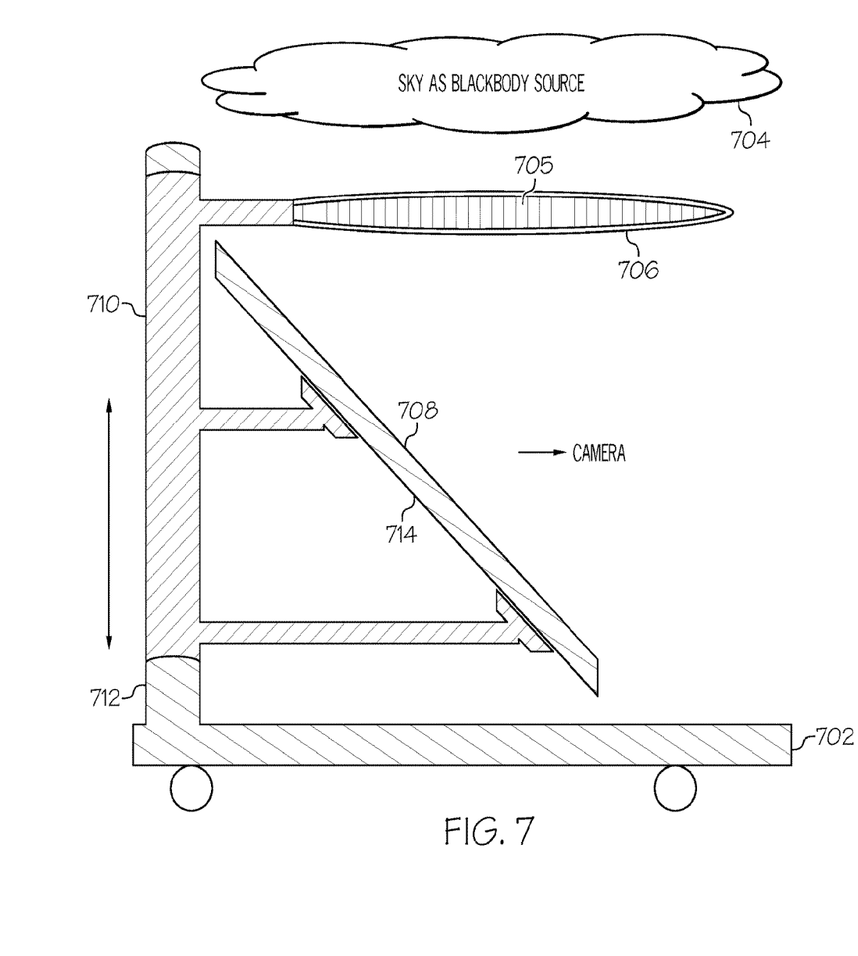
FIG. 7 illustrates an alternative embodiment of a contrast phantom in accordance with the principles of the present disclosure.

FIG. 7 illustrates an alternative embodiment of a contrast phantom in accordance with the principles of the present disclosure. In accordance with FIG. 7, a movable platform 702 supports a thermal emitter 708 (e.g., a polycarbonate slab such as described above). As in the description above, the slab 708 can include a highly-reflective coating 714 and include temperature control provisions (not shown) that maintain the slab 708 at a desired temperature. One example blackbody source (or thermal illuminator) can be the sky 704 such that thermal energy from the sky 704 impinges on the thermal emitter 708 and is reflected towards a passive millimeter wave camera. The sky 704 is merely one example of using an ambient environment for the thermal illuminator in accordance with the principles of the present disclosure. A rotating wire grid polarizer 706 is located in-between the thermal illuminator 704 and the thermal emitter 108. The thermal energy from the thermal illuminator 704 is substantially unpolarized energy and the polarizer absorbs energy aligned with the wires but allows energy orthogonal to the wires to pass through. Thus, relatively uniform linearly-polarized energy strikes the thermal emitter 708. In particular, the angle of the axis at which the energy is linearly polarized depends on the orientation of the wires 705 of the polarizer 706. As the polarizer 706 rotates, differently polarized energy results that then strikes the thermal emitter 708. One of ordinary skill will recognize that other methods and techniques for polarizing energy may be used without departing from the intended scope of the present disclosure. One example wire grid polarizer that is beneficial with millimeter waves could have a 6-in. frame with 0.001-in. wire diameter at 200 wires/inch.

The platform 702 can include a mast 712 and a mounting system 710 that are configured such that the height of the thermal emitter 708 can be varied. This movement can accommodate different placements of a camera or possibly to direct reflected energy at certain pixel locations associated with an image generated by a camera.

Figure 8:
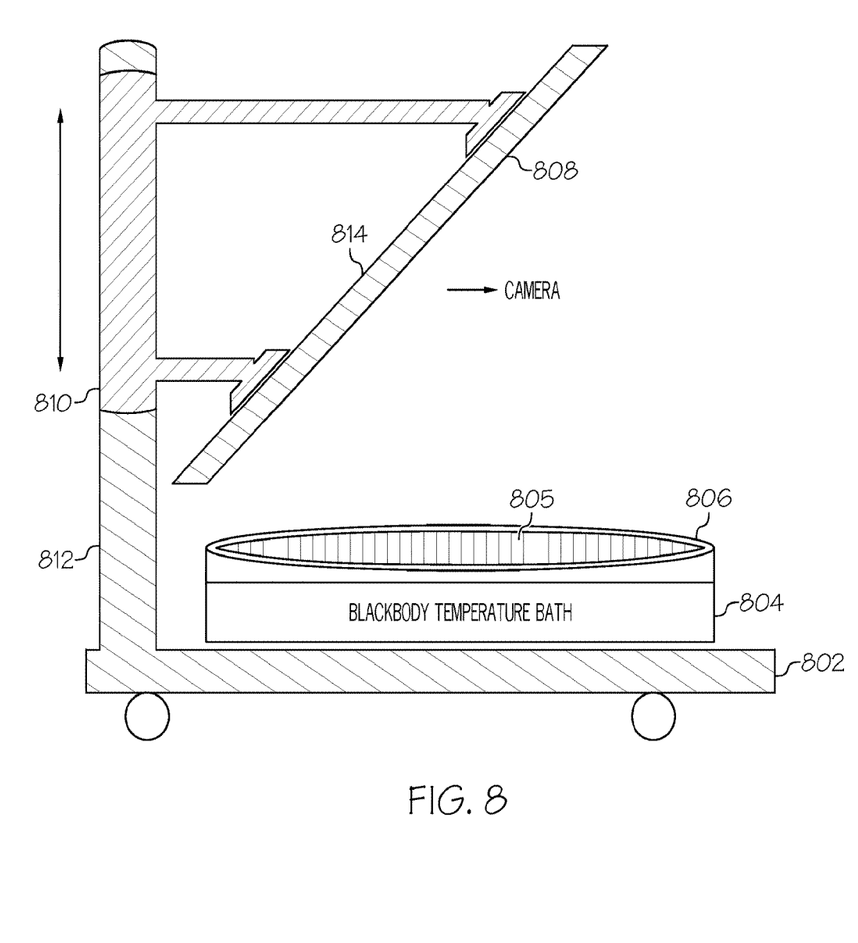
FIG. 8 illustrates another alternative embodiment of a contrast phantom in accordance with the principles of the present disclosure.

FIG. 8 illustrates another alternative embodiment of a contrast phantom in accordance with the principles of the present disclosure. The embodiment of FIG. 8 is similar to that of FIG. 7 in many ways. A movable platform 802 includes a mast 812 and mounting system 810 to support a thermal emitter 808 with a reflective backing 814. However, in FIG. 8, a blackbody illuminator 804 similar to the thermal illuminator 102 of FIG. 1 is provided. The position of the thermal illuminator 804 and the thermal emitter 808 is such that thermal energy from the thermal illuminator 804 strikes the thermal emitter 808 and is reflected to a camera.

As described with respect to FIG. 7, a rotating wire grid polarizer may be placed between the thermal illuminator 804 and the thermal emitter 808. The result is that relatively uniform linearly-polarized energy strikes the thermal emitter 708. In particular, the angle of the axis at which the energy is linearly polarized depends on the orientation of the wires 805 of the polarizer 806. As the polarizer 806 rotates, differently polarized energy results that then strikes the thermal emitter 808.

Figure 9A:
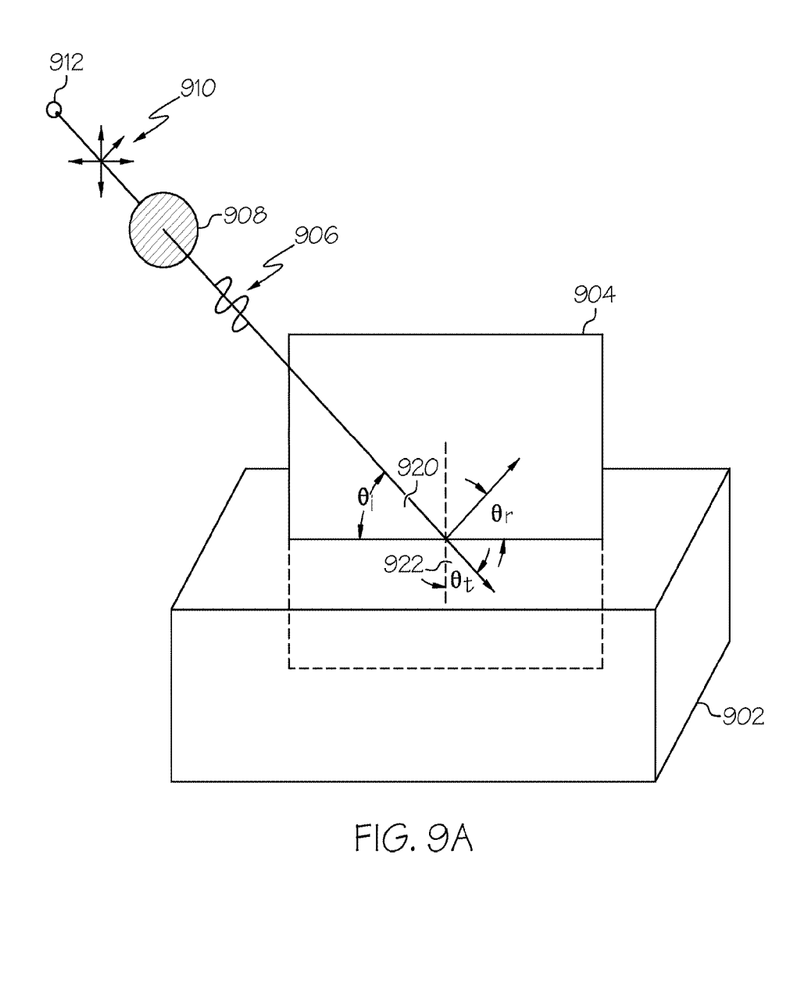
FIGS. 9A and 9B illustrate principles of energy reflection associated with the contrast phantoms of FIG. 7 and FIG. 8
Figure 9B:
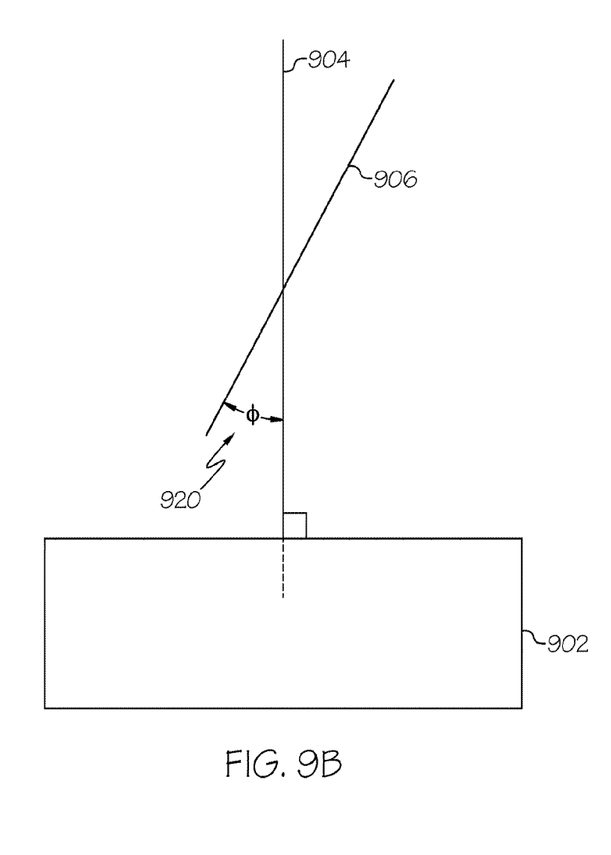

FIGS. 9A and 9B illustrate principles of energy reflection associated with the contrast phantoms of FIG. 7 and FIG. 8. A blackbody illuminator 912 emits relatively unpolarized energy 910 that reaches the wire grid polarizer 908. The result is that the unpolarized energy 910 is transformed into linearly polarized energy 906 that will strike the thermal emitter (e.g., polycarbonate slab) 902.

A plane of incidence 904 can be used to visualize the orientation of the electric field of the linearly polarized energy 904 relative to the surface of the thermal emitter 902. As more clearly shown in FIG. 9B, the linearly polarized energy 906 has an axis of polarization that forms an angle φ 920 with the plane of incidence 904. The value of the angle φ 920 depends on the orientation of the wires (e.g., 705, 805) of the rotating wire grid polarizer (e.g., 706, 806).

The linearly polarized energy 906 (also can be denoted $\vec{E}$) has a first component $\vec{E_s}$ that is perpendicular to the plane of incidence 904 and a second component $\vec{E_p}$ that is parallel with the plane of incidence 904 such that $\vec{E} = \vec{E_p} + \vec{E_s}$.

According to Fresnel equations, an intensity reflection coefficient, $r_s$, for the first component $\vec{E_s}$ is different than an intensity reflection coefficient, $r_p$, for the second component $\vec{E_p}$. In particular, $$r_s = \left| \frac{n_1 \cos\theta_i - n_2 \cos\theta_t}{n_1 \cos\theta_i + n_2 \cos\theta_t} \right|^2$$

$$r_p = \left| \frac{n_2 \cos\theta_i - n_1 \cos\theta_t}{n_2 \cos\theta_i + n_1 \cos\theta_t} \right|^2$$

where $\theta_i$ and $\theta_t$ are shown, respectively, in FIG. 9A as elements 920 and 922. Also, $n_1$ and $n_2$ correspond to respective indices of refraction for a "top" material and a "bottom" material at an interface between the two. These intensity reflection coefficients, $r_s$ and $r_p$, can be used in an equation similar to EQUATION 1 and EQUATION 2 above to estimate an apparent temperature of the thermal emitter according to EQUATION 4:

$$T_{eff} = T_0 + \tfrac{1}{2} r_\alpha (T_R - T_0)$$

where index $\alpha \in (s,p)$ denotes the polarizers configuration, $T_o$ is the temperature of a thermal backdrop or emitter, and $T_R$ is the temperature of a thermal illuminator.

Thus, the amount of energy produced by the thermal emitter (e.g., 708, 808) will depend on the relative amounts of the reflections of the first component $\vec{E_s}$ that is perpendicular to the plane of incidence 904 and the second component $\vec{E_p}$ that is parallel with the plane of incidence 904.

Thus, even though the temperature of a thermal illuminator may stay the same and even though the thickness of a thermal emitter may stay the same, an apparent temperature of the thermal emitter (e.g., 708, 808) as detected by a camera may vary because of the rotation of a wired grid polarizer (e.g., 706, 806).

The apparent temperature that the thermal emitter can achieve is bracketed by the temperature, $T_R$, of the thermal illuminator and the temperature, $T_O$, of the thermal emitter. Depending on a particular combination of polarization, slab index of refraction, and angle of incidence, an apparent temperature of the thermal emitter will appear to be between $T_O$ and $T_R$.

According to the embodiments described with respect to FIG. 7-FIG. 9B, a passive millimeter wave "beacon" can be designed wherein the rotation of the polarizer creates a variation in apparent temperature of the thermal emitter. For example, rotating the polarizer at a substantially constant speed can create a sinusoidal variation in apparent temperature of the thermal emitter. In other words, much like a viewer observes the rotating light from a lighthouse, the apparent temperature of the thermal emitter as captured by a radiometer will vary in a periodic manner between a low temperature and a high temperature. Similarly, a passive millimeter wave "display" system could be constructed where individual pixels are controlled. In other words, low and high apparent temperatures would correspond to black and white pixel values and variations in the position of the polarizer will determine particular gray scale pixel values at an appropriately place camera.

One of ordinary skill will recognize that a wide variety of motors, gears and other mechanisms may be utilized to rotate the rotating wire grid polarizer in such a way as to precisely control a speed of rotation and also to not cause interference with the energy arriving at, or departing from, the polarizer.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A system comprising:
a wire grid polarizer, wherein the polarizer is positioned between a thermal illuminator and a thermal emitter such that energy from the thermal illuminator traveling towards the thermal emitter is transformed into linearly polarized energy;
the thermal emitter, wherein the thermal emitter is configured to reflect at least a portion of the linearly polarized energy towards a millimeter-wave camera, wherein the millimeter-wave camera is positioned near the thermal emitter so as to receive at least a part of the reflected portion of the linearly polarized energy; and
a motor coupled with the wire grid polarizer and configured to rotate the polarizer in a manner that varies an apparent temperature of the thermal emitter based on the reflected portion of the linearly polarized energy.

2. The system of claim 1, wherein a distance between the wire grid polarizer and the thermal emitter is adjustable.

3. The system of claim 1, wherein the thermal illuminator is maintained at a predetermined temperature related to the radiated energy.

4. The system of claim 1, wherein the thermal illuminator comprises an ambient environment.

5. A method comprising:
locating a wire grid polarizer between a thermal illuminator and a thermal emitter such that energy radiated from the thermal illuminator traveling towards the thermal emitter is transformed into linearly polarized energy;
reflecting, by the thermal emitter, at least a portion of the linearly polarized energy towards a millimeter-wave camera, wherein the millimeter-wave camera is positioned near the thermal emitter so as to receive at least a part of the reflected portion of the linearly polarized energy; and
rotating the wire grid polarizer in a manner that varies an apparent temperature of the thermal emitter based on the reflected portion of the linearly polarized energy.

6. The method of claim 5, comprising:
adjusting a distance between the wire grid polarizer and the thermal emitter.

7. The method of claim 5, comprising:
maintaining the thermal illuminator at a predetermined temperature related to the radiated energy.

8. The method of claim 5, wherein the thermal illuminator comprises an ambient environment.

9. A system comprising:
a wire grid polarizer, wherein the polarizer is positioned between a thermal illuminator having a temperature $T_R$ and a thermal emitter having a temperature $T_O$ such that energy from the thermal illuminator traveling towards the thermal emitter is transformed into linearly polarized energy;
the thermal emitter, wherein the thermal emitter is configured to reflect at least a portion of the linearly polarized energy towards a millimeter-wave camera, wherein the millimeter-wave camera is positioned near the thermal emitter so as to receive at least a part of the reflected portion of the linearly polarized energy; and
a motor coupled with the wire grid polarizer and configured to rotate the polarizer in a manner that varies an apparent temperature $T_{eff}$ of the thermal emitter based on the reflected portion of the linearly polarized energy $T_O$, and $T_R$.

* * * * *